June 21, 1932.
L. L. CUNNINGHAM
Re. 18,503
REGULATING SYSTEM
Original Filed July 23, 1924
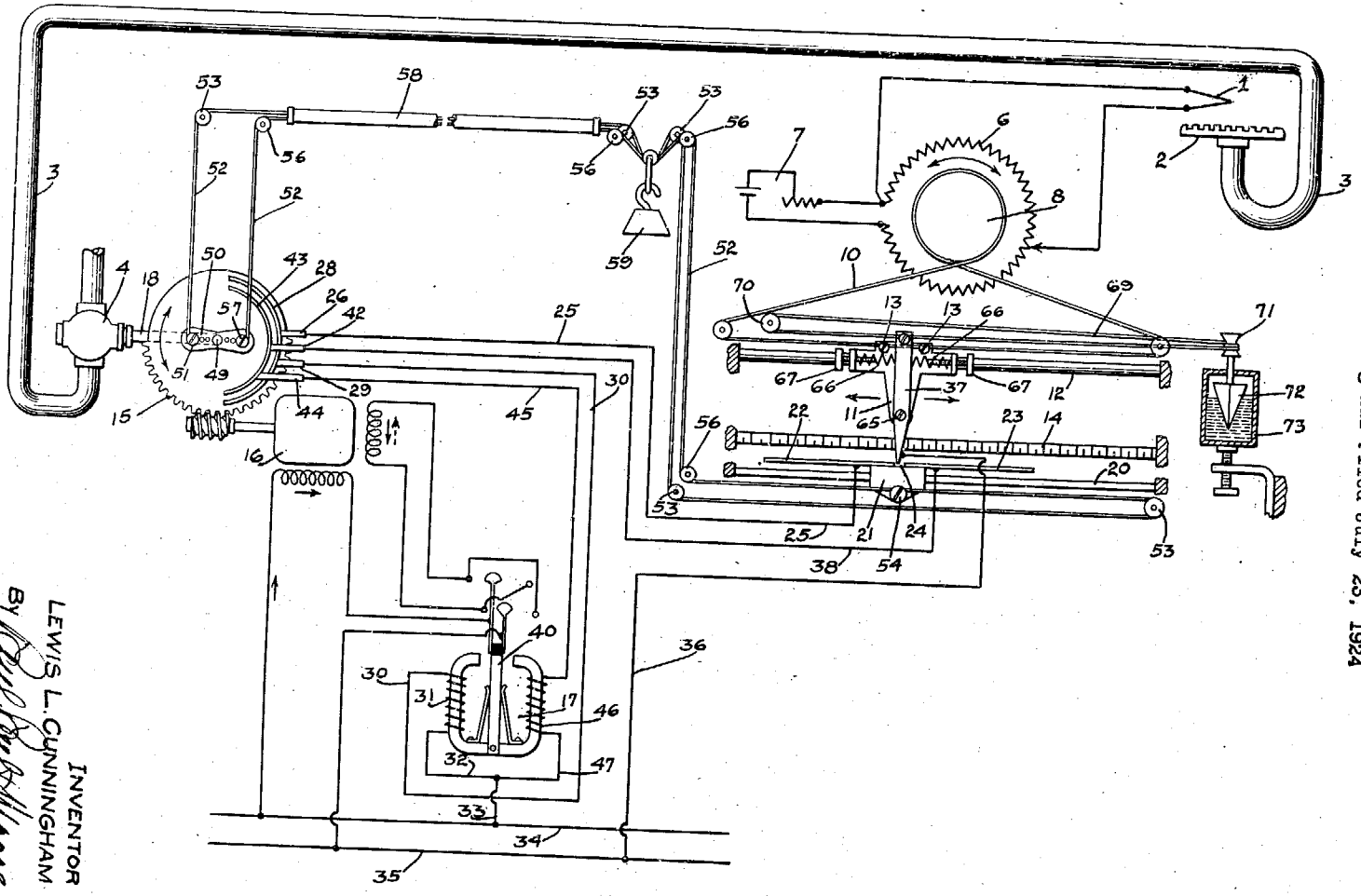
INVENTOR
LEWIS L. CUNNINGHAM
By Paul Paul & Moore
ATTORNEYS Reissued June 21, 1932 Re. 18,503

UNITED STATES PATENT OFFICE

LEWIS L. CUNNINGHAM, OF MINNEAPOLIS, MINNESOTA, ASSIGNOR TO MINNEAPOLIS-HONEYWELL REGULATOR COMPANY, OF MINNEAPOLIS, MINNESOTA, A CORPORATION OF DELAWARE

REGULATING SYSTEM

Original application filed July 23, 1924, Serial No. 727,836. Renewed November 16, 1929. Original No. 1,768,890, dated July 1, 1930. Application for reissue filed May 16, 1931. Serial No. 537,966.

This invention relates to improvements in apparatus adapted to automatically regulate physical conditions at the point of control, to substantially prevent variation in such conditions, or to permit such variation only in some predetermined degree which is determined by the adjustment of the apparatus.

The invention finds valuable application in the control of furnace or other temperatures, and where it is desirable to have the temperature under control vary as little as is practicable, between predetermined limits. The invention also finds valuable application for controlling sources of fuel supply such as gas, oil or electricity, and by its use, the supply of fuel to a burner may be controlled by any suitable mechanism which can be actuated by a suitable electrically controllable means such as a motor, for example a reversible motor.

The method of this invention is a departure from the commonly used "two point" control. In the latter method, any suitable thermometer having a movable member is utilized to close and open an electric circuit through a solenoid, which operates a valve or other mechanism, to control fuel in-put to the furnace under control. When the temperature drops to a predetermined point, contact is made or broken as the case may be, and the valve is actuated to permit fuel delivery, and obtain, or increase, heat supply. On temperature rise, and at a predetermined temperature, a reverse operation takes place. It is clear that in the system just described, the heat in-put to the furnace is never accurately adjusted to the requirements. It is either too high or too low all of the time, with a consequent surging back and forth of the temperature past the desired operating point.

The purpose of the system herein is to automatically supply heat at a steady rate, and to so adjust the supply as to maintain an even temperature between the permissible upper and lower operating limits, and very close to the desired operating point. The invention is adapted for a large range of applications for regulation of various kinds of physical effects.

It is one of the objects of this invention to provide a control system wherein the variation of the condition to be controlled can be delicately measured or regulated and wherein small changes in the condition are caused to produce mechanical movements of sufficient magnitude to operate a switch or equivalent device in such manner that the full operating cycle is not immediately accomplished or does not pass immediately from limit to limit, but is accomplished in part, gradually or in small increments, in substantially exact accordance with the changing conditions at point of control, and then continues in the same direction in correspondence to the similar change of condition, or the control may act intermittently and/or reversely in some predetermined relation.

In the drawing a special type of thermometer has been illustrated, but there is no intention to limit the system to any particular condition to be controlled nor any particular instrument responsive to that condition.

Objects, features and advantages of the invention will appear in the description of the drawing, said figure diagrammatically illustrating one of the many possible embodiments of the invention.

Referring to the drawing: Numeral 1 indicates a thermo-couple shown associated with a heat producing device, such as a burner, the fuel supply for which burner is to be controlled. These elements are symbolic of a physical condition to be controlled, and of means for varying the physical condition. This heat supply element or condition-changer is indicated at 2. A supply pipe for the burner is indicated at 3, and a valve for controlling the pipe is indicated at 4. The thermo-couple 1 is assumed to be located at the point where temperature is to be controlled and is connected to a potentiometer system, parts of which are respectively indicated at 6—7. The drum 8 is adapted to move with resistance 6 of the potentiometer. An automatic self-balancing apparatus (not shown) operates to rotate the drum until the electro-motive force developed by the thermo-couple 1 is balanced by the potential drop in resistance 6 between the points to which the thermo-couple is connected. The motion of the drum is transmitted by the endless cord 10 to an indicator member 11 slidably guided on rod 12, to which member 11 the cord 10 is adjustably attached as at 13. When properly calibrated, the position of the sliding member 11 with respect to the scale 14 is a measure of the temperature at the point at which the thermo-couple 1 is located. This mechanism forms no part of the present invention, but merely illustrates one type of thermometer with which the invention can be used. In this description, as in actual practice, movement of the member 11 to the left corresponds to a lowering of the temperature under control, and the movement to the right, to a rise of that temperature.

Numeral 15 indicates a gear or any other suitable element (capable of any kind of motion) connected by any suitable means such as shaft 18 with valve 4, so that when the gear is rotated in one direction, the valve moves in closing direction, and when the gear moves in an opposite direction, the valve correspondingly moves in opening direction. Any form of controller may be substituted for the valve, provided that the movement of such controller correspondingly varies the rate of heat delivery to the thermocouple. It is conceivable that the element 15 or its equivalent may be attached to the rotor of a voltage regulator or to a valve controlling gas or air or other medium, and that it may be mechanically connected to another valve so that gas and air may be controlled simultaneously or it may be connected to a mixing valve. It is clear that the actual means of control of heat or other supply may be varied to suit the various conditions and in accordance with the character of the source of heat energy. Rotation of the gear 15 in one direction may result in decrease in rate of heat energy delivery to the furnace and a rotation in the opposite direction may result in an increased rate of delivery.

A reversible motor 16 is suitably connected for rotating the element 15 conformably to direction of rotation of the motor rotor; worm gearing is shown. Any type of motor may be used, although the reversible type is claimed in combination. In circuit with the motor for reversing it, is a selectively operable relay generally indicated at 17.

Slidably mounted on a bar 20 is a block 21. Carried by the block, but suitably insulated therefrom, and from one another, are a pair of bars respectively indicated 22—23. These bars are spaced apart as at 24, in this instance slightly spaced. The bar 22 is connected by conductor 25 with a brush 26 contacting limit switch segment 28 carried by and suitably insulated from the rotatable member 15. Brush 29 contacts the same segment 28 and conductor 30 connects this brush with one end of coil 31 of the relay. The opposite end of the coil 31 is connected by conductor 32 with conductor 33 in turn connected to power line 34. Power line 35 is connected by conductor 36 with pointer-like switch arm 37, pivoted to member 11, which arm is alternatively engageable with contacts 22—23. Other switching means may be employed. Contact 23 is connected by conductor 38 to brush 42 contacting with limit switch segment 43 of member 15. Brush 44 contacts the same segment and is connected by conductor 45 with one end of magnet coil 46. The other end of this coil is connected by conductor 47 with conductor 33 and, therefore, with line 34. Armature 40 is adapted to be alternatively attracted according as coil 31 or 46 is energized. Arm 40 operates the contacts for reversing the motor in the usual manner.

Motion of block 21, and, therefore, of the contacts 22, 23, is controlled by element 15, in this instance mechanically, and means is provided whereby the ratio of degree of motion between 21 and 15 can be varied. It is conceivable, however, that the motion control could be electrical, and there is no intention to limit the invention to the particular means shown. Suitably fastened to the gear 15 is a member 50 having arms diametrically related to the pivotal axis 49 of the gear, and to this member, at one side of its pivot, is secured as at 51, the end of a wire or other flexible element 52 having one portion suitably guided as at 53, and adjustably connected to the slide 21, as at 54. The other portion of the wire is guided by suitable means 56, and the opposite end is connected as at 57 to the member 50 at the opposite side of the axis 49. This wire may pass through suitable housing 58 and a weight 59 acts as slack take-up means, to provide for alteration in the effective length of cable 52. This will also compensate for temperature changes. By loosening screw 54, the block 21 may be moved independently of the wire, and then re-clamped to the wire at any suitable position. Rotation of the gear 15 results in motion of the member 21, and it is evident that the movement of the element 21 may be made any desired function of the degree of gear rotation by suitably altering the size or shape of the member 50, or by securing the ends of the wire at points nearer to or farther from the axis 49.

*Operation*

If the indicator 11 moves sufficiently, as it will on sufficient change of temperature at the thermo-couple 1, contact 37 will engage either bar 22 or bar 23, depending on the direction of motion and on the direction of temperature change at the thermo-couple. Let it be assumed that the temperature moves downwardly, then the tip of element 37 makes electrical contact with bar 22, and a circuit is closed through coil 31 of the relay as follows: 35, 36, 37, 22, 25, 26, switch segment 28, 29, 30, 31, 32, 33 to 34. The armature 40 of the relay 17 will, in this instance, be moved to the left and the motor circuit closed by means of one of the switching elements controlled by the armature. The motor will then rotate in a predetermined direction so as to correspondingly increase the rate of heat delivery to the point under temperature control. Conversely when the contact 37 moves in the opposite direction and engages the bar 23, coil 46 is energized, and the motor reversed, and the element 15 rotated in an opposite direction to decrease the rate of heat delivery. In the latter instance, the circuit is as follows: 35, 36, 37, 23, 38, 42, 43, 44, 45, coil 46, conductor 47, conductor 33, to line 34. The armature 40 will then be moved to the right and the motor will be reversed by the other armature-controlled switching element.

Motor 16 will continue to operate as long as 37 and 22 remain in contact, but a slight motion of slide 21, and therefore of the bar 22 to the left will break the contact, and when this occurs, the motor will stop. The result, therefore, is an adjustment of the rate of delivery of heat energy at the point 1, under temperature control, and it is clear that by properly controlling the sliding motion (or any other suitable motion) of element 21, any desired control of temperature may be effected.

It is seen that the electrical and mechanical connections can be so adjusted that when contact is made, for example between the bar 22 and the member 37, the slide 21 will be moved to the left until contact is broken, at which time the motor will stop, due to de-energization of relay coil 31 and movement of the switch to the position shown in the drawing. If the temperature at the thermo-couple continues to fall, the contact 37 will be again moved to the left and contact will again be made with bar 22 and rotation of the gear will continue in the same direction, and consequently the rate of delivery of heat energy at the thermo-couple by the element 2 will be increased. This operation may be repeated until the heat balance is obtained, or until the element 18 operated by the gear 15 has reached its maximum supply position. Obviously, after this maximum supply position is reached, it is not desirable to permit a continued rotation of the gear 15 in that direction. The limit switch 28 prevents this continued rotation, by opening the circuit through the bar 22 and coil 31, and thus the system becomes inoperative in regard to any lower temperature. If the temperature at the thermo-couple 1 rises, and member 37 moves a sufficient distance to the right, then the circuit through the coil 46 is closed, and the armature 40 moves to the right to reverse the direction of rotation of the motor and of element 15, and the slide 21 moves to the right to break contact between bar 23 and contact 37. This operation will then be repeated in the same direction until the heat balance in the opposite direction is obtained, or until the element 18 has reached its minimum supply position, at which time the limit switch 43 acts to break the electric circuit through bar 23 and coil 46. It is to be noted that the coil 31 of the relay 37 is again energized as soon as the sliding member 21 has moved appreciably to the right.

Usually, in practice, the furnace temperature is required to be maintained between definite upper and lower limits. For example, normal temperature may be one thousand degrees with a permissible variation of twenty-five degrees plus or minus, giving a range of fifty degrees. In this case, the member 50 and the mechanical connections of the gear 15 to the heat control unit would be so proportioned that the motion of the gear 15 through its full range would result in moving the indicator 37 through a distance corresponding to fifty degrees on the scale 13.

It is clear that when the indicator 37 has moved to the nine hundred seventy-five degree mark on the scale, the heat supply mechanism will be in a position corresponding to the maximum rate of delivery of heat energy, and when the indicator 37 arrives at the ten hundred twenty-five degree mark, the heat supply mechanism will be at a position corresponding to the minimum rate of heat delivery. The apparatus, therefore, always tends to adjust itself so as to produce a stable operating temperature between the operating limits for which it is adjusted.

In many cases, it is found desirable to accelerate the rate of heat in-put to the furnace, with an increasing departure from the normal temperature. With this system, this may be easily accomplished by substituting a differently shaped member 50, or by changing the points of connection of the ends of the wire 52 relative to the axis 49. For example, as shown in the drawing, a certain degree of motion of the gear 15 will cause the indicator or contact 37 to move a certain distance along the scale. During rotation of the gear 15 from the position shown, and until the member 50 is perpendicular to its original position, the degree of motion of the slide 21 is proportionately lessened. The rate of heat delivery may, therefore, be made any desired function of the departure of the temperature at the thermo-couple 1, from the normal temperature, by altering the position of the connections relative to the axis 49.

Provision is made for changes which may be required, in point of temperature control, by having the cable 52 adjustably fastened to the slide 21 by means of the screw or equivalent element 54. For example, if the gear 15 be placed in a position corresponding to one-half of the full rate of heat delivery, and then the sliding member 21 be secured to the cable 52 at that position on the scale which corresponds to the desired point of temperature control, then the system will be operated in such a way as to tend to bring the temperature at the point of control to the desired value.

Under normal conditions, the bars 22 and 23 do not have to be very long, because the end of the element 37 is always between the ends of the bars. By having the bars of a greater length, however, contact with either bar is maintained and the system will always tend to operate to a balance, even though initially the position of the element 37 is far removed from the space between the bars.

In many cases where the temperature of the furnace under control is subject to sudden and comparatively large variations, due to loading or other conditions, it is desirable as far as possible to have the control system anticipate these changes. To meet these conditions, the contact point 37 has the form of a lever pivoted as at 65 to the element 11. Springs 66 are arranged at opposite sides of the upper portion of the lever 37 and are held by adjusting screws 67 carried by the indicator or slide 11, and these springs tend to maintain the axis of the element 37 perpendicular to the direction of motion of the slide 11 to the long dimension of the scale and to direction of motion of the block 21. Fastened to the lever 37 is the endless cable 69 which passes around a suitable pulley 70 and around a second pulley 71 which latter pulley is arranged on the spindle of a rotary dashpot 72. The dash-pot is so arranged that by altering the height of the container 73 the retarding effect may be altered.

It is clear that a sudden motion of the indicator 37 due to a sudden change of temperature at the point of control will result in disturbing the right-angular relation of the indicator 37 with respect to the direction of motion of the slide 11. In such a case, the gear 15 would be rotated farther than would be the case if the dash-pot were used, and the rate of heat in-put to the furnace would, therefore, be accelerated more than would otherwise be the case. By adjusting the dash-pot to obtain the proper retarding effect, the rate of heat in-put to the furnace may be made any desired function of the rate of change of the temperature under control. It is to be noted that this dash-pot action is superposed upon or is complementary to the previously described action, due to the actual departure of the temperature from the normal value.

Under certain conditions, it may be desirable to have the motor 16 rotate appreciably after the contact between 37 and 22 or 23 is broken, so that adjustments of the rate of heat in-put will be fewer but of larger value. In this case, the armature shaft of the motor may be equipped with a flywheel of any desired moment of inertia so that after the current is cut off from the motor, it will continue to rotate appreciably. This will result in control steps which are somewhat larger but less frequent. Conversely, an automatic solenoid operated brake may be used which will release while the voltage is applied to the motor but will grip instantly when current is interrupted. Operating conditions will determine which of these methods shall be used, although in many cases neither will be used, since the moment of inertia of the armature will be sufficient to supply the necessary over-run.

It is clear that the operation of this system is not necessarily confined to use with an indicator having a straight line horizontal motion such as illustrated. Many indicators have a circular path or motion and it is obvious that the system may be adapted to this circular motion without altering the essential elements of this invention. I, therefore, reserve the right to all such modifications as may fall within the spirit of the appended claims.

I claim as my invention:

1. In a temperature control system the combination of a temperature indicating member automatically movable in response to change of temperature at the point of temperature control, a rotative energy control member actuated by a reversible electrical motor, electrically operated means for reversing the direction of rotation of the said electrical motor, a pair of electrical contacts, fixed with respect to each other, cooperating with an electrical contact, associated with the said indicating member, for the control of the direction of rotation of the said electrical motor; flexible cable means of transmitting motion of the said rotative energy control member to the said pair of electrical contacts; and a cam shaped member adapted to cooperate with the said flexible cable means and to predetermine for different angular positions of the said rotative energy control member, the ratio of motion of the said pair of movable contacts with respect to motion of the said rotative energy control member.

2. A temperature control system including an electrical contact carried by a temperature indicating member; a pair of movable electrical contacts, fixed with respect to each other and cooperating with the said electrical contact, for the reversible control of an electrical motor; a heat delivery control member actuated by the said electrical motor; a cam shaped member in mechanical relation with the said heat control member; a flexible cable, adapted by means of pulleys, to transmit motion of the said cam shaped member to the said pair of electrical contacts so that motion of the said pair of electrical contacts may be in any desired function of motion of the said heat control member, and the resultant control of the rate of heat delivery to the point under temperature control may be in any desired function of the temperature at the point under temperature control.

3. A temperature control system including a pair of electrical contacts adapted to cooperate with an electrical contact, movable in response to change of temperature at the point under temperature control, for the control of an electrical motor, said motor being adapted to actuate a heat delivery control member; mechanical means of transmitting, in any desired ratio, motion of the said heat delivery control member to a flexible cable, said cable being adapted to move the said pair of electrical contacts, and mechanical means adapted to movably fix the position of the said pair of electrical contacts relative to a fixed point on the said flexible cable so that the normal point of temperature control may thereby be changed.

4. A temperature control system having a temperature indicator; an electrical contactor carried by the said temperature indicator; a pair of contacts movable in response to motion of a heat control member; a motor to actuate the said heat control member, the said motor being controlled by cooperation of the said movable contacts and the said contact carried by the said temperature indicating member; and dashpot means of altering cooperation of the said movable contacts and the said contact so that resulting control of the rate of heat delivery to the point under temperature control may be in a predetermined, but changeable, function of the rate of change of temperature at the point under temperature control.

5. A temperature control system having a temperature indicator; an electrical contact carried by the said indicator; a pair of contacts movable in response to motion of a heat control member; a motor adapted to actuate the said heat control member, the said motor being controlled by cooperation of the said movable contacts and the said contact carried by the said indicating member; and dashpot means of altering cooperation of the said movable contacts and the said contact so that resulting control of the said electric motor, and therefore control of the rate of heat delivery to the point under temperature control, may be in a predetermined, but changeable, function of rate of change of temperature at the point under temperature control.

6. A device of the class described comprising a first contact, and means automatically thermally operable to move the contact in opposite direction, a pair of contacts fixed to move in unison and separately engageable with or by the first contact, a movable element carrying a limit switch, mechanical connections for obtaining movements of said pair of contacts by said movable element, and means for obtaining reversing motions of said movable element, including electrical connections between said limit switch, said first contact, and said pair of contacts, said first and said pair of contacts being slidable with respect to each other.

7. A device of the class described comprising a first contact, and means automatically thermally operable to move the contact in opposite direction, a pair of contacts fixed to move in unison and separately engageable with or by the first contact, a movable element carrying a limit switch, mechanical connections for obtaining movements of said pair of contacts, by said movable element, and means for obtaining reversing motions of said movable element, including electrical connections between said limit switch, said first contact, and said pair of contacts, said movable element being rotatable and said first and said pair of contacts being slidable with respect to each other.

8. In a follow up control system, means automatically responsive by movement to change in physical conditions at point of control, a reversing motor, means for controlling the motor, said controlling means being controlled by said first mentioned means, means for varying the physical conditions at point of control including a member movable by the motor, and means directly mechanically controlled by said movable member and mechanically remote from said first named automatically responsive means for limiting motion of said movable member by breaking an electric circuit for the motor.

9. In a follow up control system, means automatically responsive by movement to change in physical conditions at point of control, a reversing motor, a motor control switch controlled by said first named means, circuit conductors connecting said first named means and the motor control switch and also connecting said motor and motor control switch, means for varying the physical conditions at point of control including a member movable by the motor, and a limit switch directly mechanically controlled by the motor and mechanically remote from said first named automatically responsive means, for limiting motion of said motor by breaking one of the circuit connections formed by the above mentioned circuit conductors.

10. In a control system, means automatically responsive by movement to change in physical conditions at point of control, a reversing motor, a motor control switch, means including interconnecting circuit conductors for controlling the control switch by means of said first named automatically responsive means, means including circuit conductors whereby the reversing motor is controlled by said control switch, means for varying the physical conditions at the point of control including a member movable by the motor, and a limit switch mechanically remote from the first named automatically responsive means and connected to the circuit conductors of the control switch control means, said limit switch being directly mechanically controlled by said motor and being operative to limit movement of the motor by establishing a gap in the circuit of the motor switch control means.

11. In a control system, means automatically responsive by movement to change in physical conditions at point of control and operating a contact, reversibly movable means for controlling the variation of physical conditions at point of control, a pair of contacts movable in unison and with which said first contact is alternatively engageable, means by which the pair of contacts are moved by said condition-varying element, a limit switch directly controlled by said condition-varying means and being remote from said first named means, means reversibly electrically operable for correspondingly controlling the condition-varying means, and circuits for controlling said electrically operable means including therein all of said contacts and said limit switch, whereby motion of a single means directly controls variation of the physical conditions, controls the pair of contacts, and controls the limit switch for directly limiting its own motion.

12. In a control system, means automatically responsive by movement to change in physical conditions at point of control and operating a contact, reversibly movable means for controlling the variation of physical conditions at point of control, a pair of contacts movable in unison and with which said first contact is alternatively engageable, means by which the pair of contacts are moved by said condition-varying element, and means by which said means is adjustable to vary the ratio of the degree of motion between the pair of contacts and said condition-varying means, a limit switch directly controlled by said condition-varying means and being remote from said first named means, means reversibly electrically operable for correspondingly controlling the condition-varying means, and circuits for controlling said electrically operable means including therein all of said contacts and said limit switch, whereby motion of a single means directly controls variation of the physical conditions, controls the pair of contacts, and controls the limit switch for directly limiting its own motion.

In witness whereof, I have hereunto set my hand this 4th day of May, 1931.

LEWIS L. CUNNINGHAM.